US012747690B2

(12) United States Patent
White et al.

(10) Patent No.: US 12,747,690 B2
(45) Date of Patent: Sep. 29, 2026

(54) BELT DRIVE SYSTEM FOR CENTRIFUGAL PUMP PRIMING ACCESSORIES

(71) Applicant: Cornell Pump Company LLC, Clackamas, OR (US)

(72) Inventors: Jordan Russell White, Canby, OR (US); Brandon Yoder, Bethune, SC (US); Jordan A. Hall, Vancouver, WA (US)

(73) Assignee: Cornell Pump Company LLC, Clackamas, OR (US)

( * ) Notice: Subject to any disclaimer, the term of this patent is extended or adjusted under 35 U.S.C. 154(b) by 0 days.

(21) Appl. No.: 19/058,117

(22) Filed: Feb. 20, 2025

(65) Prior Publication Data

US 2025/0305445 A1 Oct. 2, 2025

Related U.S. Application Data

(60) Provisional application No. 63/572,431, filed on Apr. 1, 2024.

(51) Int. Cl.
*F02B 67/06* (2006.01)
*F16H 7/02* (2006.01)
(Continued)

(52) U.S. Cl.
CPC ............... *F02B 67/06* (2013.01); *F16H 7/02* (2013.01); *F16H 7/12* (2013.01); *F16H 2007/0842* (2013.01)

(58) Field of Classification Search
CPC ... F02B 67/06; F16H 7/02; F16H 7/12; F16H 2007/0842; F16H 7/023; F16H 7/1263;
(Continued)

(56) References Cited

U.S. PATENT DOCUMENTS

| | | | | |
|---|---|---|---|---|
| 122,932 A | | 1/1872 | Batcheller | |
| 470,927 A | * | 3/1892 | Edison ...................... | F16H 7/06 474/139 |

(Continued)

FOREIGN PATENT DOCUMENTS

| | | | |
|---|---|---|---|
| CN | 208311059 U | 1/2019 | |
| CN | 110939575 A | 3/2020 | |

(Continued)

OTHER PUBLICATIONS

Extended European Search Report in European Appln. No. 25164738.4, mailed on Jul. 18, 2025, 8 pages.

*Primary Examiner* — Henry Y Liu
(74) *Attorney, Agent, or Firm* — Fish & Richardson P.C.

(57) ABSTRACT

Systems and methods described herein provide a belt drive with necessary power transfer for a vacuum priming system while enabling simplified belt replacement. In one implementation, an auxiliary drive system for driving a vacuum pump in a pump priming system is provided. The auxiliary drive system includes a drive sprocket attached to a drive shaft of a main pump, an auxiliary sprocket attached to a shaft of the vacuum pump, an idler pulley mounted to an engine bracket of the main pump, and an endless drive belt having an inner side and an outer side. The idler pulley causes the endless drive belt to engage the drive sprocket and rotate the auxiliary sprocket without the endless drive belt encircling the drive sprocket.

16 Claims, 8 Drawing Sheets

(51) Int. Cl.
*F16H 7/08* (2006.01)
*F16H 7/12* (2006.01)

(58) Field of Classification Search
CPC .... F04D 29/044; F04D 13/021; F04D 29/628; F04D 9/04; F05D 2260/4021; F05D 2260/55
See application file for complete search history.

(56) References Cited

U.S. PATENT DOCUMENTS 574,646 A * 1/1897 Walkins .................... F16H 7/02 474/138
687,146 A * 11/1901 Fleckenstein ........... F16H 27/04 474/84
803,556 A * 11/1905 Charter ..................... F16H 7/06 474/139
2,412,839 A * 12/1946 Smith ..................... F04D 9/043 417/202
2,464,144 A * 3/1949 Mcconaghy ............ F04D 9/046 415/18
3,025,658 A * 3/1962 Wendel .................. D01H 1/241 474/131
3,152,434 A * 10/1964 Kemmler ............... D01H 1/241 474/135
3,238,802 A * 3/1966 Boleslaw ............... D06C 15/02 474/58
3,422,692 A 1/1969 Woodring
3,603,069 A * 9/1971 Greive ................... D01H 1/241 474/134
3,730,011 A * 5/1973 Cahill ..................... F16H 7/023 474/139
3,892,140 A * 7/1975 Fox .......................... F16H 7/00 474/139
3,951,006 A * 4/1976 Fisher ..................... F16G 5/166 474/139
4,029,438 A * 6/1977 Sloan ........................ F04D 9/00 418/97
4,402,240 A * 9/1983 Moyer .................. B23D 25/12 83/345
4,481,005 A * 11/1984 Mann, Jr. ................ F16H 7/023 474/139
4,666,187 A * 5/1987 Koot ..................... F16L 37/002 285/27
4,822,321 A * 4/1989 Webb ........................ F16H 7/14 474/135
5,536,147 A * 7/1996 Lang ..................... F04D 29/605 417/199.2
5,660,533 A * 8/1997 Cartwright ................ F04D 9/04 417/435
5,685,265 A 11/1997 Yoshikawa
6,086,494 A * 7/2000 Crosta ....................... F16H 7/24 474/139
6,119,638 A * 9/2000 Kennedy ................... F01P 5/10 123/41.46
6,497,634 B1 * 12/2002 Bode ....................... F16H 55/54 474/139
6,692,234 B2 * 2/2004 Muhs ................. B01D 21/0039 417/199.2
6,783,330 B2 * 8/2004 Carnes .................... F04D 9/043 137/434
6,945,889 B2 * 9/2005 Markley ............... F16H 7/0848 474/111
7,011,505 B2 * 3/2006 Muhs ................. B01D 21/0012 137/565.34
7,021,271 B2 4/2006 Kitamura et al.
7,591,204 B2 9/2009 Ueno et al.
7,794,211 B2 * 9/2010 Muhs ...................... F04D 9/042 417/199.2
7,824,286 B2 11/2010 Schmid et al.
7,857,720 B2 12/2010 Lacy
8,123,458 B2 2/2012 Racer et al.
8,246,316 B2 * 8/2012 Muhs ...................... F04D 9/042 417/68
8,303,444 B2 11/2012 Gajewski
8,506,435 B2 8/2013 Geraghty
8,662,862 B2 * 3/2014 Muhs .................. F04D 29/2288 417/69
9,003,788 B2 * 4/2015 Alexander ................ F02G 5/04 60/527
9,017,194 B2 * 4/2015 Richardson ............. E21B 3/022 474/84
9,121,147 B2 * 9/2015 Karsten ................. E01C 23/088
9,587,641 B2 * 3/2017 Mettler ................... F04D 9/043
10,054,200 B2 8/2018 Aubertin et al.
10,151,374 B2 12/2018 Kusano
10,667,664 B2 * 6/2020 Sheikh ................ A47L 11/4011
11,162,415 B2 * 11/2021 O'Brien ................. H02K 7/003
11,203,968 B2 * 12/2021 Jochman ................... F01P 1/06
11,441,479 B2 * 9/2022 Richards ................. F02B 67/06
2002/0098090 A1 * 7/2002 Muhs ...................... F04D 9/041 417/313
2004/0067806 A1 * 4/2004 Markley ............... F16H 7/0848 474/111
2004/0120828 A1 * 6/2004 Muhs .................... F04C 11/005 417/69
2006/0110261 A1 * 5/2006 Muhs .................... F04D 29/708 417/68
2007/0163529 A1 7/2007 Hartmann et al.
2010/0016106 A1 1/2010 Minemura
2011/0008183 A1 * 1/2011 Muhs ........................ F04D 7/04 417/199.2
2011/0124451 A1 * 5/2011 Alexander ................ F02G 5/04 60/527
2012/0312392 A1 * 12/2012 Muhs ................ B01D 21/0039 137/334
2013/0090200 A1 * 4/2013 Richardson ........... F16H 37/065 474/139
2013/0272843 A1 * 10/2013 Mettler ................... F04D 9/043 415/203
2014/0190284 A1 7/2014 Xykis et al.
2014/0270952 A1 * 9/2014 Karsten ................. E01C 23/088 404/75
2015/0370214 A1 * 12/2015 Ishida ................ G03G 21/1857 399/167
2016/0098000 A1 * 4/2016 Furuichi ................... F16H 7/18 399/329
2017/0138445 A1 5/2017 Farewell et al.
2019/0186493 A1 6/2019 Dreifert et al.
2020/0158115 A1 * 5/2020 Mei ..................... F04D 15/0005
2021/0122237 A1 * 4/2021 Melone ................ B60K 17/105
2022/0297664 A1 * 9/2022 Crisp ........................ B60L 7/10
2022/0314790 A1 * 10/2022 O'Brien ................. B60K 25/02
2023/0003167 A1 * 1/2023 Richards ............... F16D 27/112
2023/0193816 A1 * 6/2023 Dmytrow .............. F16H 7/1254 123/559.1
2023/0332679 A1 * 10/2023 Hedstrom .............. F16H 57/01

FOREIGN PATENT DOCUMENTS

| | | | |
|---|---|---|---|
| CN | 210770071 | U | 6/2020 |
| CN | 213981185 | U | 8/2021 |
| CN | 219159199 | U | 6/2023 |
| DE | 102013206970 | B4 | 10/2014 |
| DE | 10-2019-135016 | A1 | 2/2020 |
| EP | 3388679 | A1 | 10/2018 |
| JP | S62-165594 | A | 7/1987 |
| JP | 6397051 | B2 | 9/2018 |
| JP | 6782384 | B1 | 11/2020 |
| JP | 2022008185 | A | 1/2022 |
| WO | 2023153305 | A1 | 8/2023 |

* cited by examiner

BELT DRIVE SYSTEM FOR CENTRIFUGAL PUMP PRIMING ACCESSORIES

CROSS-REFERENCE TO RELATED APPLICATION

This application claims priority to under 35 U.S.C. § 119, based on U.S. Provisional Patent Application No. 63/572,431 filed Apr. 1, 2024, titled "Belt Drive System for Centrifugal Pump Priming Accessories," the disclosure of which is hereby incorporated by reference.

BACKGROUND

Centrifugal pumps are commonly used for moving liquids for irrigation, domestic water systems, and many other applications. Liquid is typically urged through the pump by a spinning disk-shaped impeller positioned inside an annular volute. The volute typically has an eye at the center where water enters the pump and is directed toward the eye or center of the impeller. The rotation of the impeller slings the liquid outward to the perimeter of the impeller where it is collected for tangential discharge. As the liquid is driven outwardly, a vacuum is created at the eye, which draws more fluid into the pump.

One of the basic limitations on the use of centrifugal pumps is their limited ability to draw fluid for priming when starting from an air-filled or dry condition. The impeller, which is designed to pump liquids, often cannot generate sufficient vacuum when operating in air to draw liquid up to the pump when the standing level of the liquid is below the eye of the pump. Thus, in some applications, to begin pumping, the pump must first self-prime by drawing water up to the pump from a low water level. An auxiliary vacuum pump may be included with the centrifugal pump for this purpose. The auxiliary vacuum pump serves to evacuate air from the suction line, priming the centrifugal pump and allowing the system to commence pumping.

DETAILED DESCRIPTION

Figure 1:
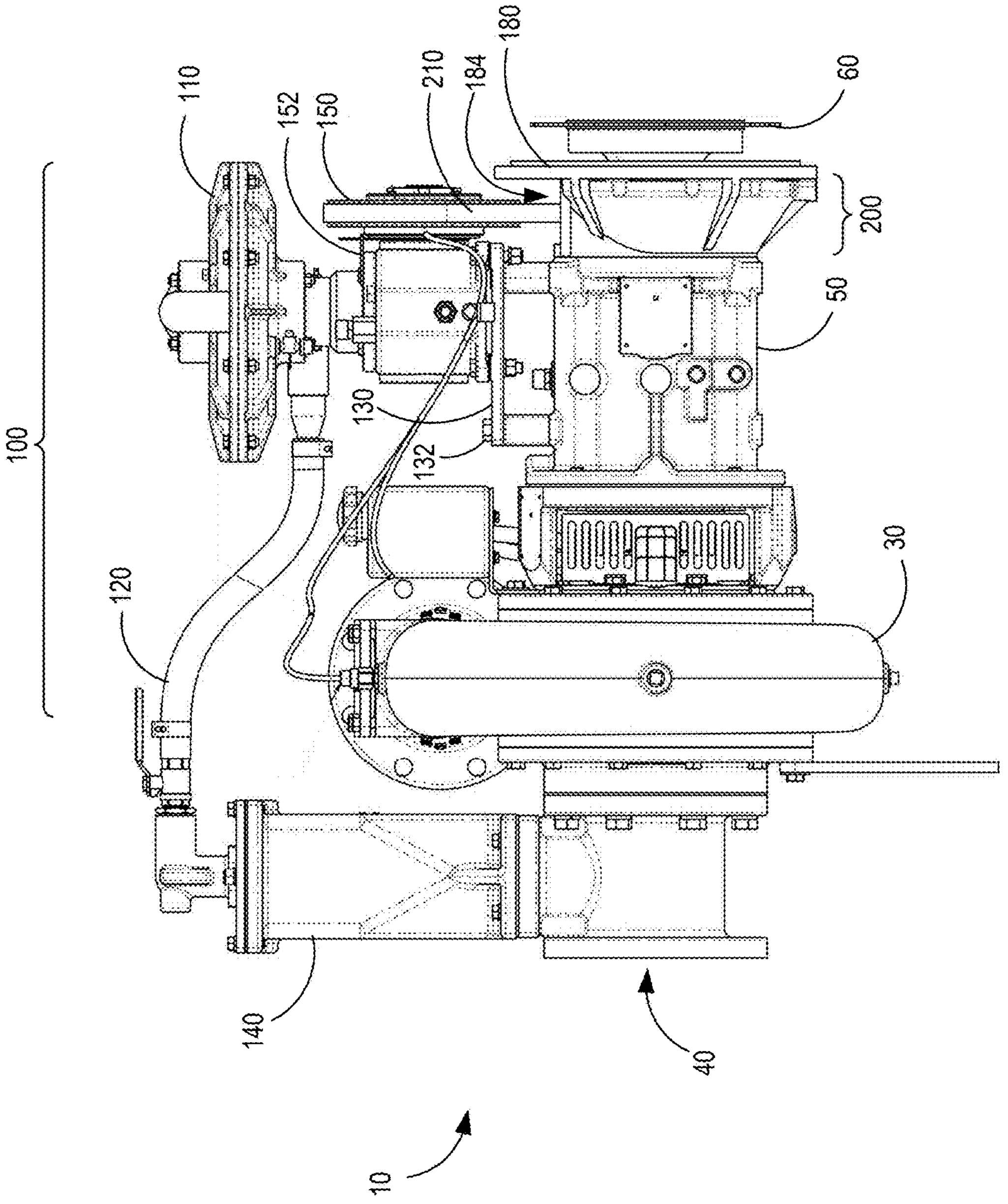
FIG. 1 is a side view of centrifugal pump including an auxiliary vacuum priming system, in which systems and methods described herein may be implemented.

The following detailed description refers to the accompanying drawings. The same reference numbers in different drawings may identify the same or similar elements. Also, the following detailed description does not limit the invention.

Systems and methods described herein provide a belt drive system for an auxiliary vacuum pump that facilitates belt replacement with minimal disruption. Centrifugal pumps equipped with self-priming systems typically use an auxiliary vacuum pump to evacuate air from a suction line, allowing the system to begin pumping. In self-priming systems, the auxiliary vacuum pump is typically driven from the same drive shaft (i.e., the primary drive shaft) used by the centrifugal pump. The functionality of the vacuum pump relies on a belt system, which engages with a series of sprockets to transmit rotational force from the primary drive shaft of the main centrifugal pump. An endless belt (referred to herein as a drive belt or endless drive belt) spans both the main centrifugal pump drive shaft (also referred to herein the drive shaft) and the vacuum pump drive shaft (also referred to as the vacuum pump shaft).

On one end, the drive shaft is linked to pump internals (e.g., an impeller). On the other end, the drive shaft is directly linked to a primary driver, typically a flywheel coupled to a diesel engine or a shaft coupled to an electric motor shaft. When the drive belt experiences a failure or reaches the end of its expected lifespan, replacement becomes necessary. However, with a traditional belt drive configuration, the replacement task entails the disassembly of the centrifugal pump from both the engine and the foundational package, incurring significant costs in terms of down time, labor hours, and materials.

According to implementations described herein, a belt drive system (also referred to herein as an auxiliary drive system) incorporates a passive idler pulley, paired with a double-sided toothed belt, to facilitate power transmission between a primary drive shaft and a vacuum pump shaft without encircling the primary drive shaft. According to another implementation, an adjustable idler pulley (also referred to herein as a tensioner pulley) is provided as part of the belt drive system. The adjustable idler pulley eliminates the need for shimming the vacuum pump foot to tension the belt and offers a streamlined method to attain the optimal belt tension, mitigating the tedious and error-prone aspects associated with previous tensioning processes.

In some implementations, the aforementioned passive idler pulley and the tensioner pulley may be mounted within an engine bracket that connects the centrifugal pump and the primary driver. These arrangements ensure that, in the event of a belt failure or upon reaching the end of its expected life, belt replacement can be accomplished without the necessity of a complete disassembly or removal of the centrifugal pump from the primary driver and foundation. Different size engine brackets that can accommodate the belt drive system may be provided for different pumps and pump families. Other advantages, characteristics and details will emerge from the description provided below with reference to the attached drawings and examples. However, the present invention is not limited thereto.

Figure 2:
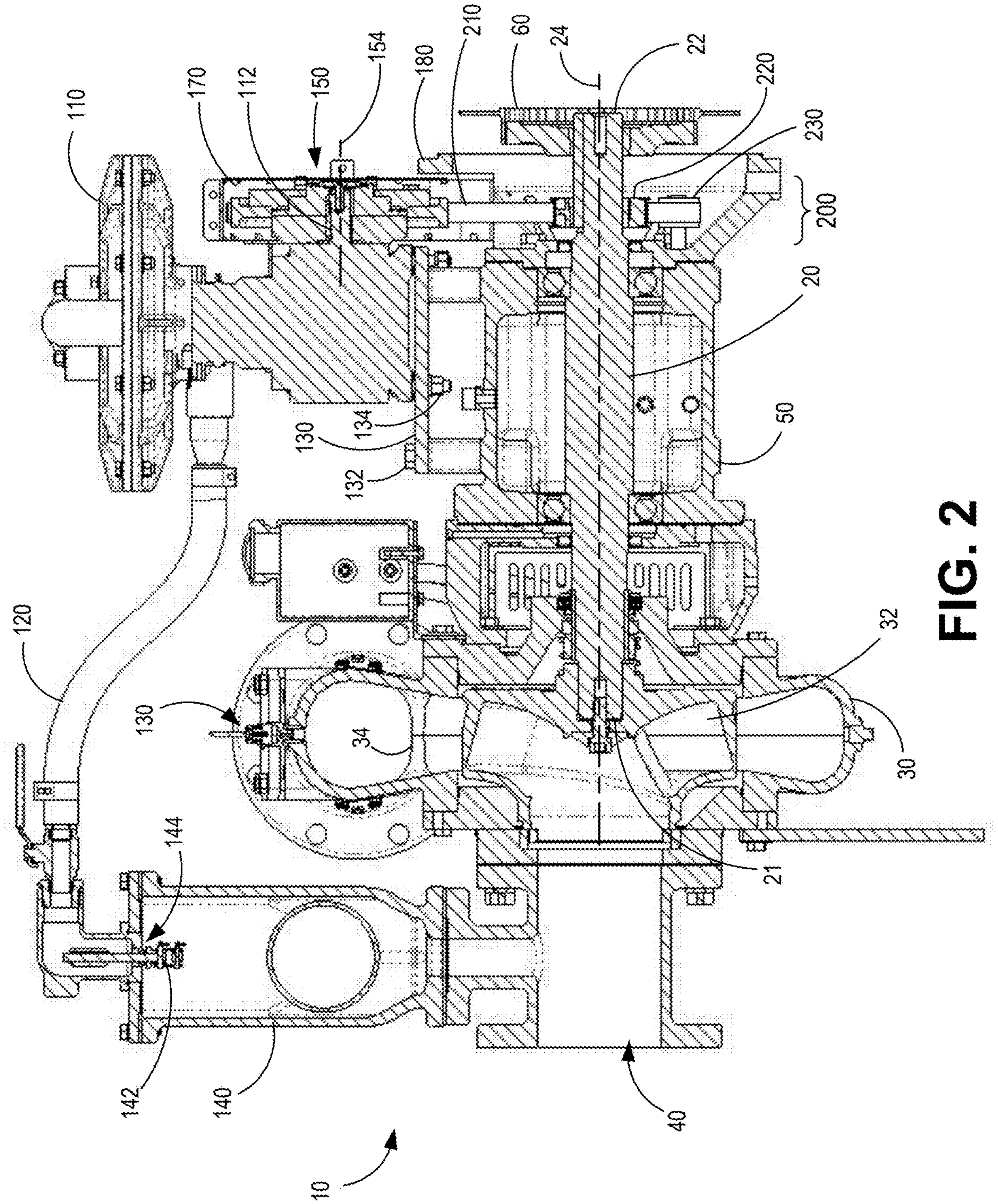
FIG. 2 is a side cross-section view of the pump assembly of FIG. 1.
Figure 3:
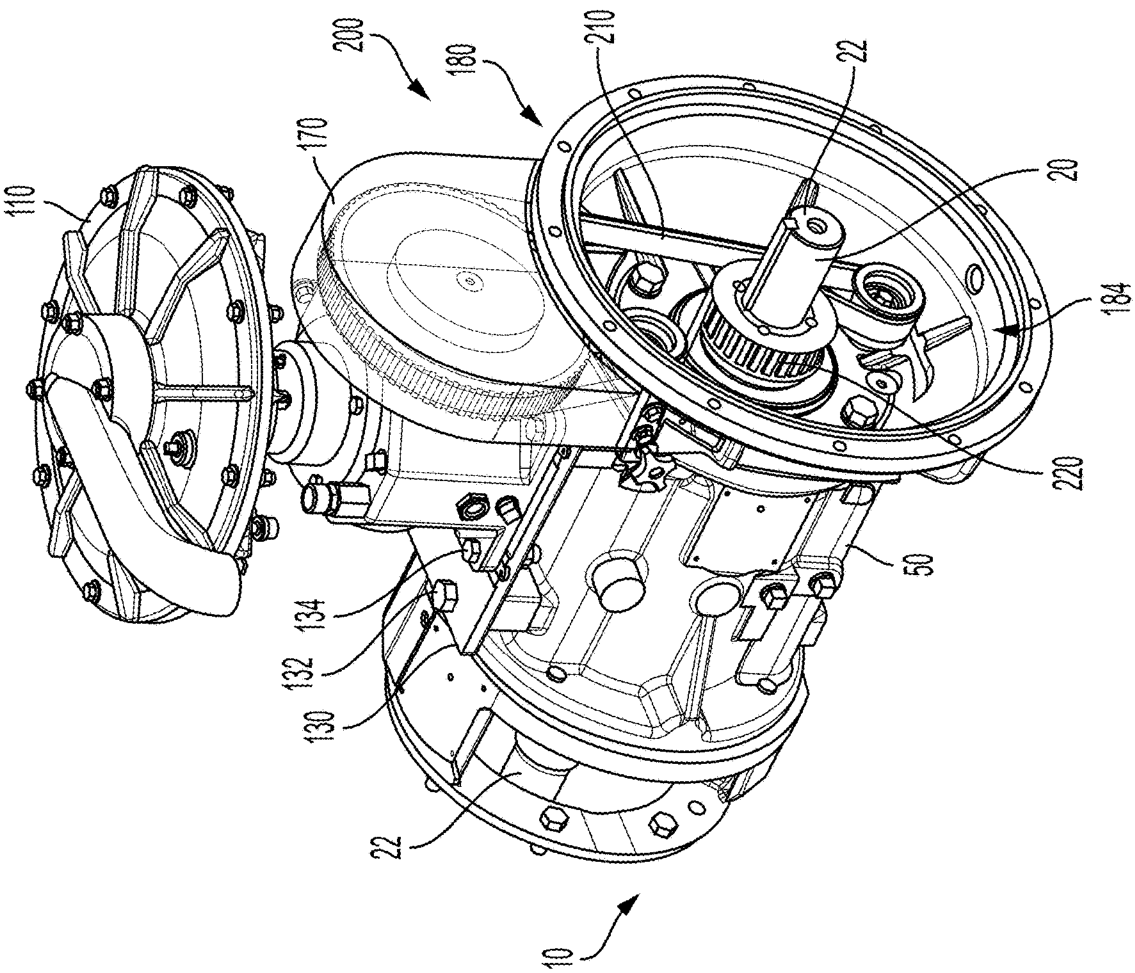
FIG. 3 is a perspective view of a belt drive system for centrifugal pump priming accessories, according to an implementation described herein.
Figure 4:
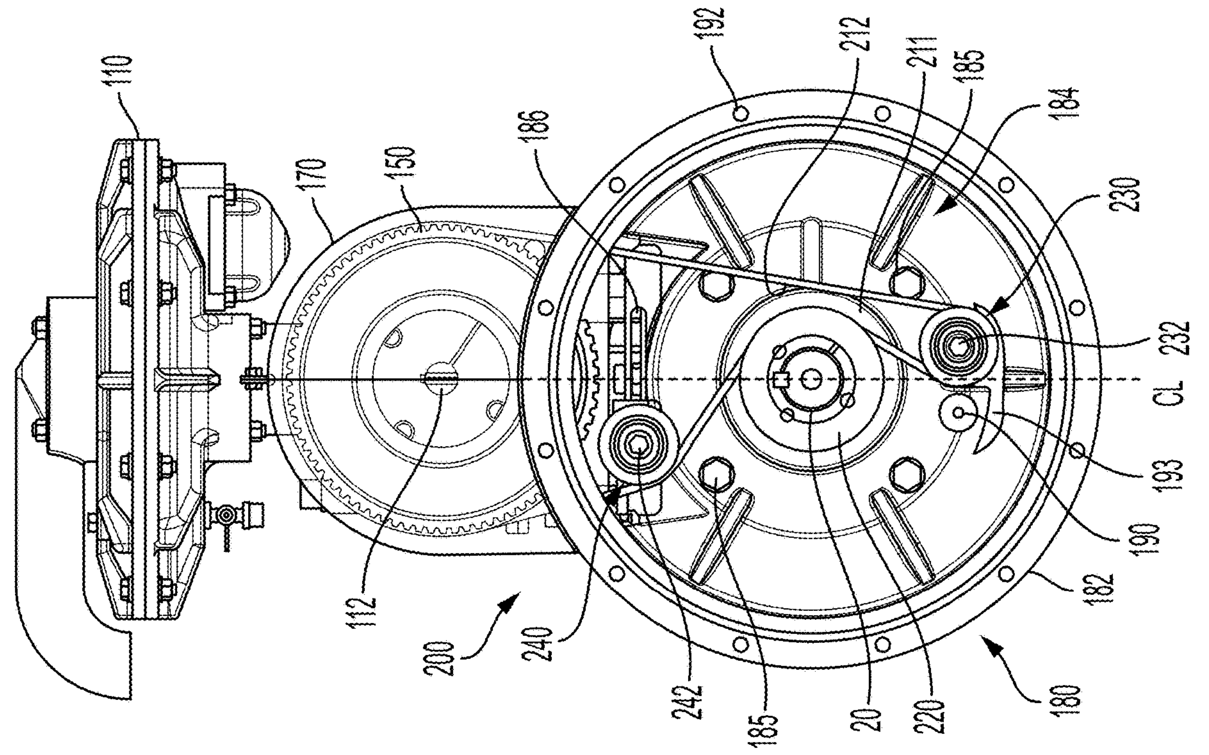
FIG. 4 is a front end view of the assembly of FIG. 3.

FIG. 1 is a side view of a centrifugal pump 10, including a full auxiliary vacuum priming system 100, in which systems and methods described herein may be implemented. FIG. 2 is a side cross-section view of the system of FIG. 1. FIG. 3 is a perspective view of a belt drive system for priming accessories mounted to a bearing frame 50 portion of a centrifugal pump 10. FIG. 4 is a front end view of the assembly of FIG. 1.

Referring collectively to FIGS. 1-4, centrifugal pump 10 may include a drive shaft 20 that drives an impeller 32 within a volute 30. Volute 30 defines a chamber within that scrolls out to a discharge port 34. Impeller 32 resides concentrically in volute 30 and rotates therein. One end 22 of drive shaft 20 may be connected by a coupling to a motor (not shown) and the other end 21 may be connected to impeller 32. The motor may cause drive shaft 20 to rotate impeller 32 around a common axis of drive shaft 20 and impeller 32. In operation, impeller 32 is rotated by the pump motor to induce a pumping action. The pumping action pulls liquid or slurry into an inlet pipe 40, through impeller 32, and out the volute discharge port 34. While centrifugal pump 10 can efficiently pump water or other liquids, it will not draw significant vacuum when operated dry (e.g., fluid is below a necessary level within pump 10). Instead, when centrifugal pump 10 is dry, priming may be accomplished with vacuum priming system 100.

Vacuum priming system 100 may include a vacuum pump 110, a suction assembly 120, platform 130, a float box 140, and an auxiliary drive system 200. Vacuum pump 110 may include a positive displacement-type pump that is configured to draw a vacuum. Vacuum pump 110 may be mounted to centrifugal pump 10. For example, vacuum pump 110 may be attached to platform 130 that is secured to a bearing frame 50 or a pump casing of centrifugal pump 10 using bolts 132. Vacuum pump 110 may include vacuum pump shaft 112 that drives vanes in vacuum pump 110 to generate suction through suction assembly 120.

Float box 140 may be mounted to inlet pipe 40 and be in fluid communication with inlet pipe 40. Float box 140 may also include a suction port 144 for suction assembly 120. When vacuum pump 110 is operating, vacuum pump 110 will evacuate air from inlet pipe 40 via suction assembly 120 and float box 140. As the air is removed from float box 140, liquid will begin to fill float box 140. As the liquid level increases in float box 140, a float valve 142 in the float box 140 will rise with the liquid level until the float valve 142 eventually closes off suction port 144.

Suction assembly 120 may include a hose or piping to connect vacuum pump 110 to float box 140. When vacuum pump 110 is engaged/operating, vacuum pump 110 may provide suction through suction assembly 120 and float box 140 to evacuate air and draw liquid (e.g., water) into volute 30 of centrifugal pump 10 for priming.

A driven sprocket assembly 150 may be mounted over vacuum pump shaft 112 that is aligned substantially parallel to main pump drive shaft 20. An L-shaped mounting bracket 152 is configured to support sprocket assembly 150 in a plane oriented orthogonally to vacuum pump shaft 112. As installed in configurations shown herein, mounting bracket 152 may include a vertical component, secured to sprocket assembly 150, and a horizontal component, secured to a housing of vacuum pump 110. According to an implementation, sprocket assembly 150 may include a clutch that selectively engages with shaft 112. When the clutch is energized and closed, rotation of sprocket assembly 150 rotates shaft 112, causing vacuum pump 110 to draw suction. When the clutch is deenergized and open, the rotation of sprocket assembly 150 will not move shaft 112, and vacuum pump 110 will not draw suction. In other implementations, sprocket assembly 150 may not include a clutch and may drive vacuum pump 110 whenever force is applied to sprocket assembly 150.

As shown in FIGS. 1, 3, and 4, a belt guard 170 may be mounted to cover sprocket assembly 150. In FIG. 2, belt guard 170 is removed for clarity. Belt guard 170 may generally cover sprocket assembly 150 and attach to an engine bracket 180.

Figure 5B:
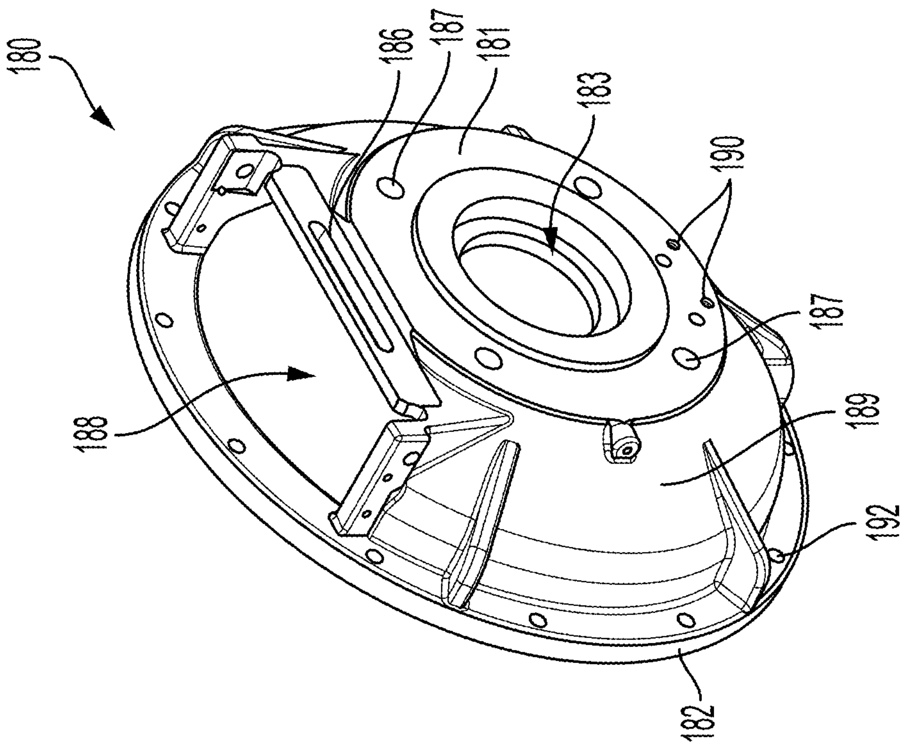
FIGS. 5A and 5B are front and rear perspective views of an engine bracket, according to an implementation.
Figure 5A:
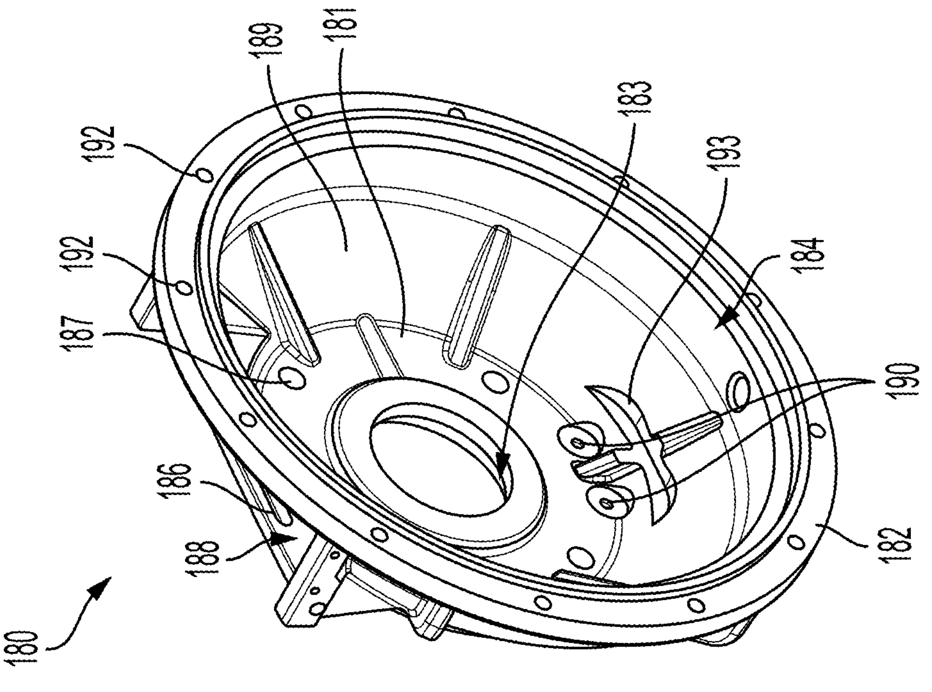

FIGS. 5A and 5B are front and rear perspective views of engine bracket 180. Engine bracket 180 may include a rigid (e.g., cast) structure that supports and aligns a primary driver (e.g., a motor or engine flywheel attached to coupling 60) with drive shaft 20.

As shown in FIGS. 4-5B, engine bracket 180 may include a faceplate 181 that includes bolt holes (e.g., holes 187) that align with corresponding holes in bearing frame 50. Engine bracket 180 may also include a substantially conical or bell-shaped wall 189 that expands outwardly from faceplate 181 to a flange 182. Flange 182 may include holes 192 for bolted connections to the primary driver for pump 10. Faceplate 181 may include a central opening 183 for drive shaft 20. The bell-shaped wall 189, faceplate 181, and flange 182 define an internal cavity 184 of engine bracket 180 that substantially encircles shaft 20 and a drive sprocket 220, as described further herein. A top opening 188 or passageway of engine bracket 180 provides access to internal cavity 184 when engine bracket 180 is installed between pump 10 and the primary driver.

Engine bracket 180 may, for example, be bolted to bearing frame 50 (e.g., using bolts 185, FIG. 4) and bolted to a coupled motor (e.g., the primary driver) via bolts through holes 192 on flange 182. Flange 182 and bolt holes 192 may be sized and oriented, for example, to meet one or more standardized interface requirements, such as a Society of Automotive Engineers (SAE) standard.

Auxiliary drive system 200 is configured to transfer power from drive shaft 20 to sprocket assembly 150 and operate vacuum priming system 100. When installed, auxiliary drive system 200 is typically covered by belt guard 170 and engine bracket 180. For example, belt guard 170 and engine bracket 180 may generally prevent access to moving parts of auxiliary drive system 200. Engine bracket 180 may cover portions of drive shaft 20 and auxiliary drive system 200.

In one embodiment, as shown in FIG. 4, auxiliary drive system 200 includes a drive belt 210 that engages sprocket assembly 150, a drive sprocket 220, an idler pulley 230, and a tensioner pulley 240. Drive belt 210 may include a continuous (e.g., endless), double-sided toothed belt, including a first (or outer) side 211 and a second (or inner) side 212. According to an implementation, side 211 of belt 210 may be configured to contact drive sprocket 220; while side 212 of belt 210 may be configured to contact sprocket assembly 150, idler pulley 230, and tensioner pulley 240. Each side 211/212 of belt 210 may have teeth with a selected length and pitch. On side 211, the teeth of the drive belt 210 may mesh with and match the length and pitch of the teeth of drive sprocket 220. One side 212, the teeth of drive belt 210 may mesh with and match the length and pitch as the teeth of sprocket assembly 150. In one implementation, the length and pitch of the teeth on sides 211 and 212 may be the same.

Sprocket assembly 150 may be mounted around shaft 112. As described above, sprocket assembly 150 may turn shaft 112 (e.g., when a clutch is engaged). Sprocket assembly 150 may include a set of teeth formed around a peripheral surface. Teeth of sprocket assembly 150 may be configured with a selected length and pitch to engage drive belt 210. In one implementation, sprocket assembly 150 may have a larger diameter, relative to the diameter of drive sprocket 220.

Drive sprocket 220 may be mounted on shaft 20 and rotate with shaft 20. Drive sprocket 220 may include a set of teeth formed around a peripheral surface. Teeth of drive sprocket 220 may be configured with a selected length and pitch to engage drive belt 210. Drive sprocket 220 may have a smaller diameter, relative to the diameter of sprocket assembly 150. Drive sprocket 220 may also include flanges. The flanges may have a diameter larger than that of the peripheral surface on which the teeth are formed.

Engine bracket 180 may be configured to mount idler pulley 230 and tensioner pulley 240. In one implementation, engine bracket 180 may be configured with one or more threaded mounting holes 190 into which idler pulley 230 may be mounted. According to one implementation, engine bracket 180 may include mounting holes 190 positioned on either side of a centerline (CL) of engine bracket 180 to enable auxiliary drive system 200 to be configured for belt placement on either side of drive sprocket 220. Engine bracket 180 may also include a slot 186 for tensioner pulley 240 as described further herein.

Idler pulley 230 may be mounted to engine bracket 180 within cavity 184. For example, idler pulley 230 may include a flat or toothed pulley mounted for rotation about a fixed shaft 232. Idler pulley 230 and shaft 232 may be collectively referred to herein as a idler pulley assembly. In one implementation, engine bracket 180 may include threaded mounting hole 190 configured to receive the idler pulley assembly with the mounting hole 190 being located lower, in relation to top opening 188, than central opening 183/drive sprocket 220.

Fixed shaft 232 may be threaded, for example, into one of mounting holes 190 to secure idler pulley 230 to engine bracket 180. Idler pulley 230 may be located such that, when side 212 of drive belt 210 wraps around idler pulley 230, side 211 of drive belt 210 can contact drive sprocket 220. More particularly, idler pulley 230 may be positioned to provide a desired contact angle, A, of belt 210 on drive sprocket 220. According to one implementation, contact angle A may be at least 90 degrees (e.g., providing contact between belt 210 and drive sprocket 220 for at least 90 degrees of the toothed peripheral surface). According to another implementation, contact angle A may be at least 110 degrees. In other implementations, contact angle A may be more than 110 degrees or less than 90 degrees. In one implementation, a recess 193 may be machined or formed into engine bracket 180 to provide clearance for idler pulley 230 and drive belt 210.

Tensioner pulley 240 may be adjustably mounted to engine bracket 180. For example, tensioner pulley 240 may include a flat or toothed pulley mounted for rotation about a moveable shaft 242. Tensioner pulley 240 and shaft 242 may be collectively referred to herein as a tensioner pulley assembly. In one implementation, tensioner pulley 240 may be adjustably fixed (or fixedly adjustable) in a position to stretch drive belt 210 to a desired working tension. An elongated opening or slot 186 may be formed through engine bracket 180. According to an implementation, shaft 242 of tensioner pulley 240 may be positioned within slot 186. A nut and lock washer may be threadedly received on one end of shaft 242 for locking tensioner pulley 240 in the desired position. According to another implementation, tensioner pulley 240 may be mounted on a frame that rides in slot 186. Screws oriented parallel to slot 186 may be used to hold the frame and tensioner pulley 240 in the desired position.

Sprocket assembly 150, drive sprocket 220, idler pulley 230, and tensioner pulley 240 may generally be aligned in the same plane (e.g., a vertical plane parallel to the plane of flange 182 of engine bracket 180 in FIG. 1). In one implementation, idler pulley 230 and/or tensioner pulley 240 may be positioned using spacers along respective shafts 232/242 to align with sprocket assembly 150 and drive sprocket 220. Engine bracket 180 may substantially encircle or surround drive sprocket 220 and idler pulley 230 that are within cavity 184.

When belt 210 is installed around sprocket assembly 150, drive sprocket 220, idler pulley 230, and tensioner pulley 240, the toothed surface on side 211 of drive belt 210 contacts the teeth of drive sprocket 220 and the toothed surface on side 212 of drive belt 210 contacts the teeth of sprocket assembly 150. Thus, rotation of drive shaft 20/drive sprocket 220 causes drive belt 210 to drive sprocket assembly 150. Drive sprocket 220 is not fully encircled by drive belt 210, and idler pulley 230 assists engagement of drive belt 201 to drive sprocket 220.

Drive belt 210 may be installed onto auxiliary drive system 200 without requiring access to either end of drive shaft 20. More particularly, to install belt 210, belt guard 170 may be removed and auxiliary vacuum pump 110 may be removed from platform 130 to provide access to opening 188 for removal and/or insertion of drive belt 210.

Figure 6C:
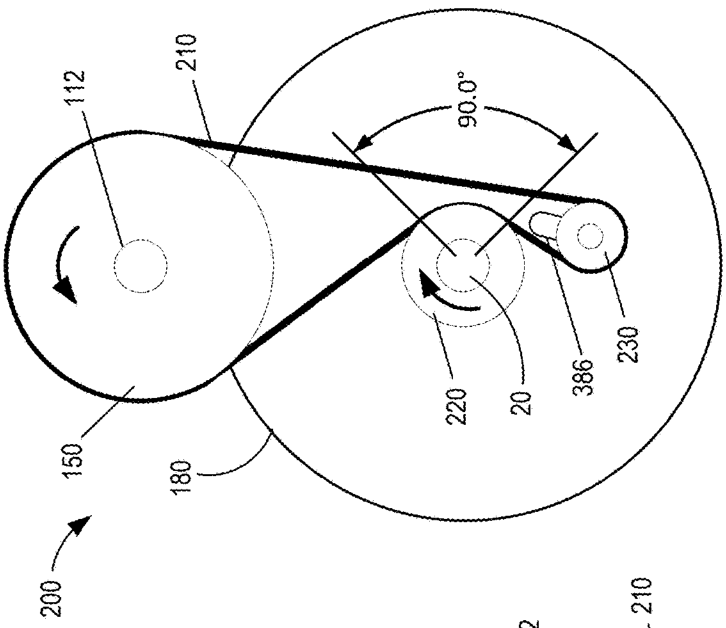
FIGS. 6A-6C are illustrations of example belt and pulley arrangements that may be used for the auxiliary drive system.
Figure 6B:
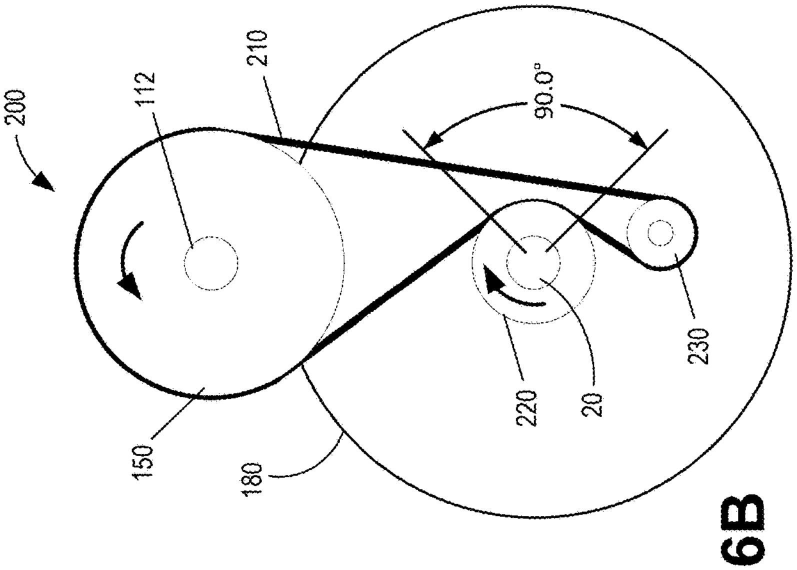
Figure 6A:
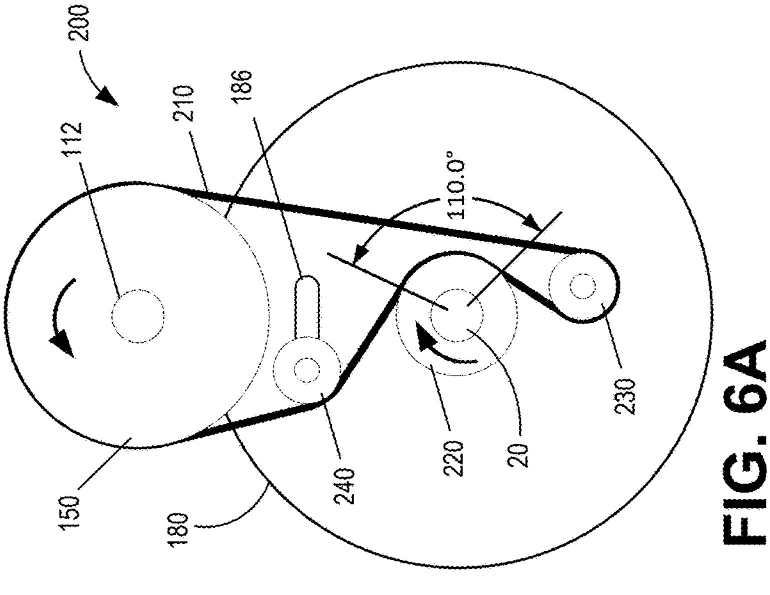

FIGS. 6A-6C are simplified illustrations of example belt and pulley arrangements that may be used for auxiliary drive system 200.

Referring to FIG. 6A, engine bracket 180 is configured to permit mounting of idler pulley 230 in a fixed position and tensioner pulley 240 in a non-dynamic adjustable position, with drive sprocket 220 between idler pulley 230 and tensioner pulley 240. Belt 210 may be installed to encircle sprocket assembly 150, idler pulley 230, and tensioner pulley 240. The inaccessible ends of drive shaft 20 prevent belt 210 from encircling drive sprocket 220, but the outside of belt 210 (e.g., side 211) may engage drive sprocket 220. The location of idler pulley 230, in relation to sprocket assembly 150 and drive sprocket 220, forces belt 210 to contact drive sprocket 220. Tensioner pulley 240 may be positioned along slot 186 to provide optimal tension for belt 210 and to increase the contact angle (CA) of belt 210 on drive sprocket 220. For example, in the configuration of FIG. 6A, the contact angle may be 110 degrees.

Referring to FIG. 6B, engine bracket 180 is configured to enable mounting of idler pulley 230 in a fixed position with drive sprocket 220 between idler pulley 230 and sprocket assembly 150. Belt 210 may be installed to encircle sprocket assembly 150 and idler pulley 230. The ends of drive shaft 20 remain inaccessible, and the outside of belt 210 (e.g., side 211) may engage drive sprocket 220. The location of idler pulley 230, in relation to the respective locations and diameters of sprocket assembly 150 and drive sprocket 220, forces belt 210 to contact drive sprocket 220. Based on the location of idler pulley 230, auxiliary drive system 200 may achieve a desired contact angle for drive sprocket 220. For example, in the configuration of FIG. 6B, the contact angle may be 90 degrees.

Referring to FIG. 6C, engine bracket 180 is configured to enable mounting of idler pulley 230 in a non-dynamic adjustable position with drive sprocket 220 between idler pulley 230 and sprocket assembly 150. Belt 210 may be installed to encircle sprocket assembly 150 and idler pulley 230. The ends of drive shaft 20 are inaccessible, and the outside of belt 210 (e.g., side 211) may engage drive sprocket 220. The location of idler pulley 230 may be adjustable along a slot 386 in a manner similar to that described above in connection with tensioner pulley 240/slot 186. In any position along slot 386, idler pulley 230 may be in a position, relative to the respective locations and diameters of sprocket assembly 150 and drive sprocket 220, to force belt 210 to contact drive sprocket 220. Based on the location of idler pulley 230, auxiliary drive system 200 may achieve a desired contact angle for drive sprocket 220. Furthermore, given the direction of slot 386, idler pulley 230 may be positioned along slot 386 to provide optimal tension for belt 210 without significantly altering the contact angle. For example, in the configuration of FIG. 6C, the contact angle may be 90 degrees.

Figure 7:
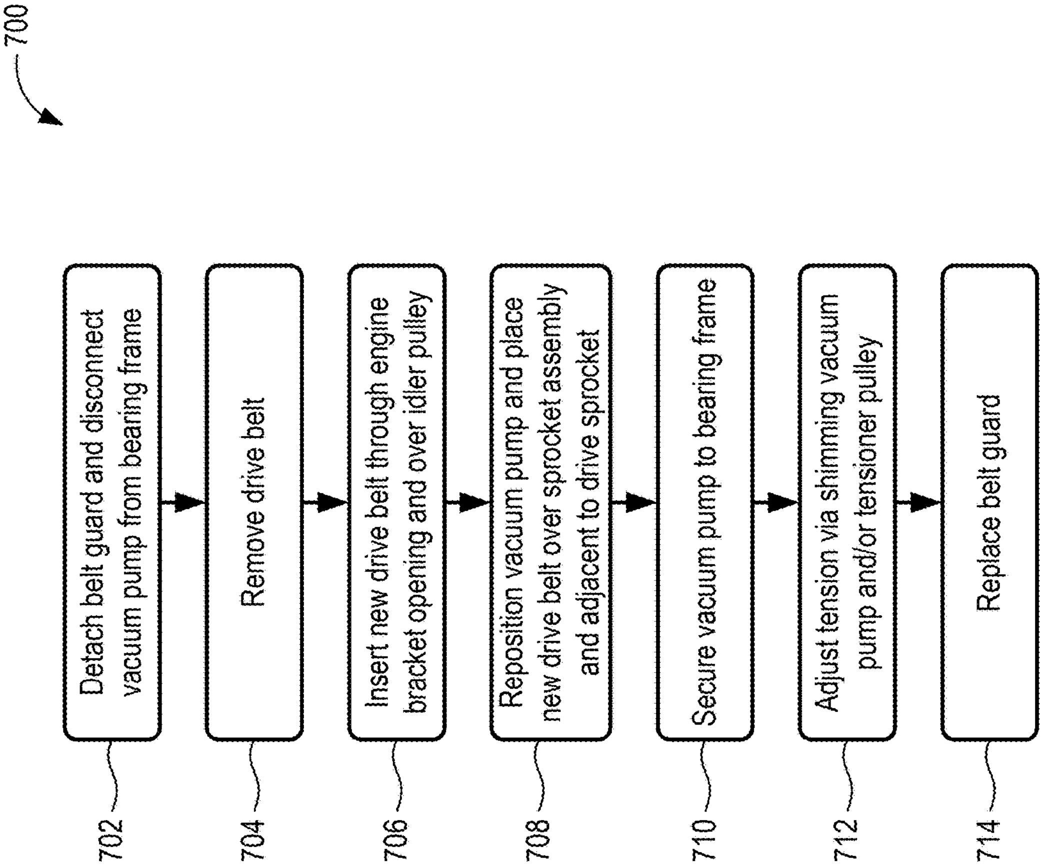
FIG. 7 is a flow diagram of a process for replacing an auxiliary drive belt on a centrifugal pump with an auxiliary drive system, according to an implementation.

FIG. 7 is a flow diagram of a process 700 for replacing an auxiliary drive belt for a centrifugal pump with auxiliary drive system 200. Process 700 may be performed by a technician, for example, as part of a field repair or scheduled maintenance.

Process 700 may include removing a belt guard and disconnecting a vacuum pump from the bearing frame (block 702) and removing the drive belt (block 704). For example, a technician may remove bolts that secure belt guard 170 to engine bracket 180 and remove belt guard 170. The technician may also remove bolts 134 (e.g., FIG. 3) to detach vacuum pump 110 from bearing frame 50 of main pump 10. If the drive belt 210 is intact, the old belt may be cut or vacuum pump 110 may be tilted forward to slide belt 210 off sprocket assembly 150. In one implementation, the unsecured vacuum pump 110 may then be slid/rotated on platform 130 to clear sprocket assembly 150 away from opening 188 and provide access to cavity 184. The old drive belt 210 may then be disengaged from idler pulley 230 (and tensioner pulley 240, if applicable) and pulled out through opening 188.

Process 700 may also include inserting a new drive belt through the engine bracket opening and over the idler pulley (block 706). For example, a new drive belt 210, sized for the particular auxiliary drive system 200, may be selected and inserted through opening 188. The drive belt 210 may be inserted past drive sprocket 220 and looped over idler pulley 230.

Process 700 may further include repositioning the vacuum pump and placing the new drive belt over the sprocket assembly and adjacent to the drive sprocket (block 708). For example, vacuum pump 110 may be reoriented to position sprocket assembly 150 over opening 188. Drive belt 210 may be looped over sprocket assembly 150 and outside side 211 of belt 210 may be aligned with drive sprocket 220 so that the teeth of belt 210 intermesh with the teeth of drive sprocket 220.

Process 700 may additionally include securing the vacuum pump to bearing frame (block 710), adjusting the belt tension (block 712), and replacing the belt guard (block 714). For example, bolts 134 may be inserted through the housing of vacuum pump 110 to secure vacuum pump 110 to platform 130/bearing frame 50. If auxiliary drive system 200 includes a tensioner pulley 240 (or if idler pulley 230 includes an adjustment slot 386), tension of belt 210 may be adjusted my moving tensioner pulley 240 or idler pulley 230 along the respective slot 186/386 to provide a desired tension. Alternatively, before tightening bolts 134, shims may be inserted between the vacuum pump 110 housing and platform 130 to adjust the height of sprocket assembly 150 for proper tensioning of belt 210. With belt 210 installed and properly tensioned, belt guard 170 may be placed over sprocket assembly 150 and reattached to engine bracket 180.

Figure 8C:
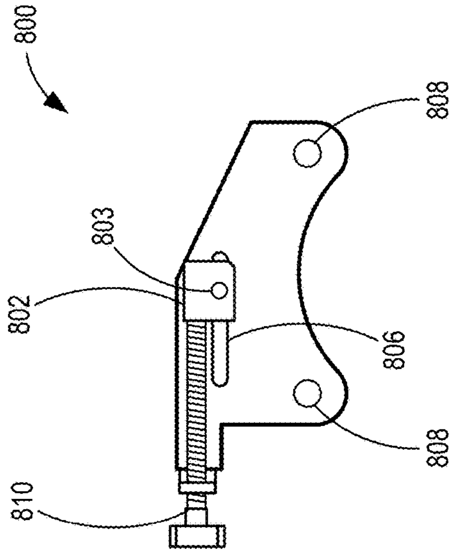
FIG. 8C is a front view of a support plate that may be used with an engine bracket of FIGS. 8A and 8B.
Figure 8B:
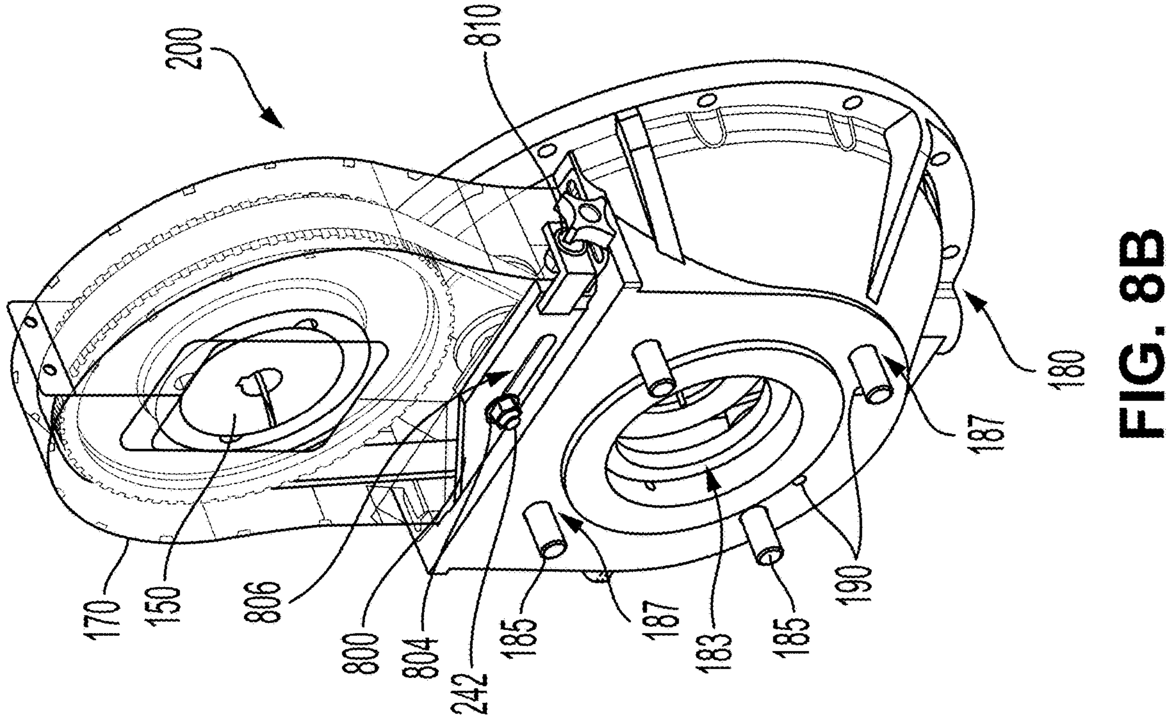
FIGS. 8A and 8B are side and rear perspective views of an auxiliary drive system, according to another implementation.
Figure 8A:
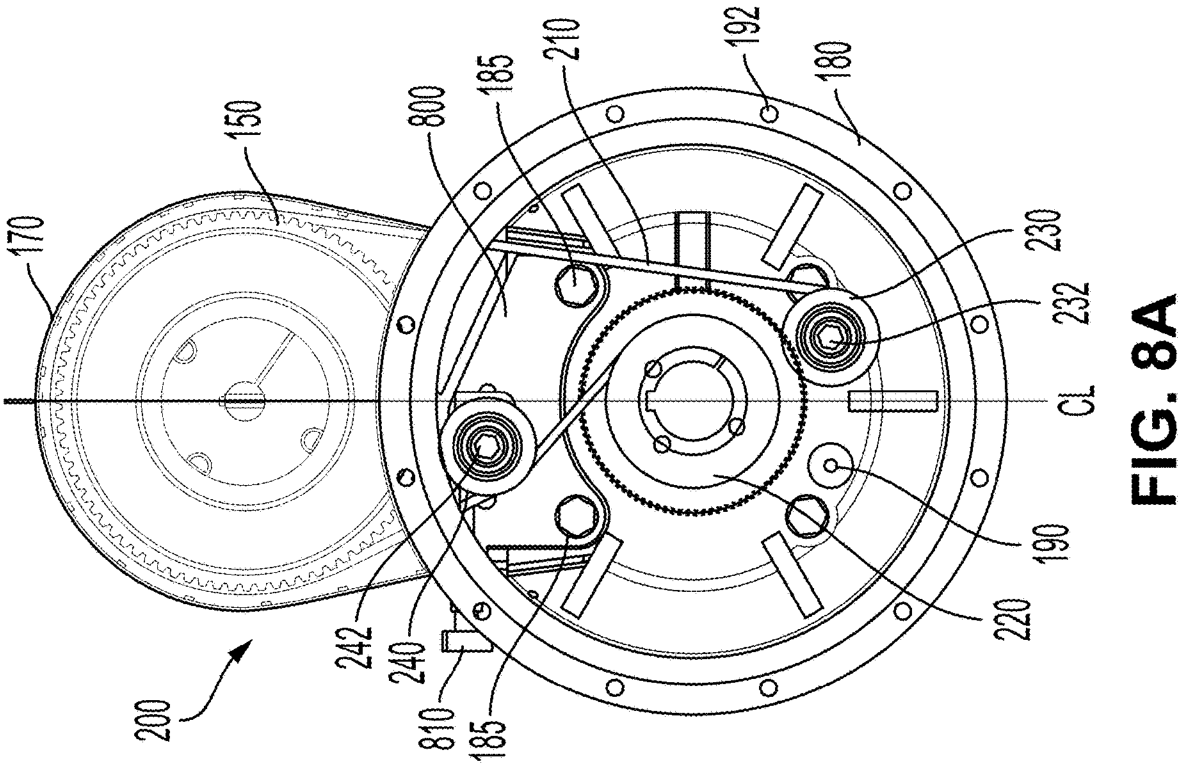

FIGS. 8A and 8B are an end view and rear perspective view, respectively, of auxiliary drive system 200, according to another embodiment. FIG. 8C is a front view of a support plate 800. In FIGS. 8A and 8B, pump 10 and vacuum priming system 100 are not shown for clarity. The embodiment of FIGS. 8A and 8B uses support plate 800 to enable mounting of a tensioner pulley 240 for smaller sized engine brackets 180, for example, or engine brackets without slots 186.

Referring collectively to FIGS. 8A-8C, support plate 800 may include a rigid (e.g., metal) plate including mounting holes 808 (behind bolts 185 in FIG. 8A and aligned with some of holes 187 in FIG. 8B) that are configured to align with some of the bolts 185 used to secure engine bracket 180 to bearing frame 50. Support plate 800 may include a slot 806 that, when plate 800 is mounted onto engine bracket 180, is oriented and configured similar to slot 186 described above, but with slot 806 located above faceplate 181 of engine bracket 180. Tensioner pulley 240 may be mounted on or against a bar 802 or plate with a shaft 242 of tensioner pulley 240 extending through a hole 803 in bar 802 and positioned within slot 806. A threaded nut 804 may be used to secure shaft 242 within slot 806. As best seen in FIGS. 8B and 8C, a threaded adjustment bolt 810 may be oriented parallel to slot 806 and connected to bar 802. Threaded bolt 810 may be turned to move bar 802 and tensioner pulley 240 along slot 806 to adjust tension of belt 210.

Similar to the configuration of FIGS. 5A and 5B, engine bracket 180 in FIGS. 8A and 8B may include mounting holes 190 to secure idler pulley 230 to engine bracket 180. In one implementation, multiple mounting holes 190 may be provided to enable orientation of belt 210 on either side of drive sprocket 220 and centerline CL. Thus, while FIGS. 8A and 8B illustrate tensioner pulley 240 to the left and idler pulley 230 to the right of centerline CL, support plate 800 may also be reconfigured to locate tensioner pulley 240 on the right side and idler pulley 230 on the left side of centerline CL.

Implementations described herein provide a belt drive with necessary power transfer for a vacuum priming system while enabling simplified belt replacement. In one implementation, an auxiliary drive system for driving a vacuum pump in a pump priming system is provided. The auxiliary drive system includes a drive sprocket attached to a drive shaft of a main pump, an auxiliary sprocket attached to a shaft of the vacuum pump, an idler pulley mounted to an engine bracket of the main pump, and an endless drive belt having an inner side and an outer side. The outer side of the drive belt includes a first toothed surface that engages the drive sprocket and the inner side of the drive belt includes a second toothed surface that engages the auxiliary sprocket and the idler pulley. The idler pulley causes the endless drive belt to engage the drive sprocket and rotate the auxiliary sprocket without the endless drive belt encircling the drive sprocket.

In another implementation, an engine bracket for a centrifugal pump is provided, the engine bracket includes a faceplate having bolt holes that align with a bearing frame of the centrifugal pump, a flange having connection holes for a primary driver of the centrifugal pump, a central opening for a drive shaft, an internal cavity configured to substantially encircle a shaft with a drive sprocket, a top opening that provides access to the internal cavity, and a mounting hole configured to receive an idler pulley assembly. The first mounting hole is located lower, in relation to the top opening, than the central opening to facilitate engagement of one side of a double-sided toothed belt with the drive sprocket and the other side of the double-sided toothed belt with an auxiliary sprocket assembly.

In still another implementation, a method is provided for installing an endless drive belt for an auxiliary drive system of a centrifugal pump with a vacuum priming assembly. The method incudes separating a vacuum pump from a bearing frame of the centrifugal pump; inserting an endless drive belt through an opening in an engine bracket of the centrifugal pump and over an idler pulley mounted in the engine bracket; positioning the vacuum pump onto the bearing frame with an auxiliary sprocket assembly of the vacuum pump over the opening; placing the endless drive belt over the auxiliary sprocket assembly and adjacent to a drive sprocket within a cavity of the engine bracket so that the endless drive belt encircles the auxiliary sprocket assembly and the idler pulley, without encircling the drive sprocket; securing the vacuum pump to the bearing frame; and adjusting tension on the endless belt.

In yet another implementation, self-priming pump system is provided. The self-priming pump system includes a main centrifugal pump and an engine bracket. The main centrifugal pump includes a pump casing and drive shaft, the drive shaft including a first end and a second end. The first end is enclosed within the pump casing, and the second end is connected to a primary driver that drives the drive shaft. The engine bracket is mounted between the main centrifugal pump and the primary driver and includes a cavity in which the drive shaft connects to the primary driver. The self-priming pump system also includes a drive sprocket attached to the drive shaft within the cavity; an auxiliary shaft configured to drive a vacuum pump assembly mounted on the pump casing; an auxiliary sprocket attached to the auxiliary shaft; an idler pulley mounted in the cavity of the engine bracket; and an endless drive belt having an inner side and an outer side. The outer side of the drive belt includes a first toothed surface that engages the drive sprocket, and the inner side of the drive belt includes a second toothed surface that engages the auxiliary sprocket and the idler pulley. The endless drive belt is configured to be installed without encircling the drive sprocket.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

As set forth in this description and illustrated by the drawings, reference is made to “an exemplary embodiment,” “an embodiment,” “embodiments,” etc., which may include a particular feature, structure or characteristic in connection with an embodiment(s). However, the use of the phrase or term “an embodiment,” “embodiments,” etc., in various places in the specification does not necessarily refer to all embodiments described, nor does it necessarily refer to the same embodiment, nor are separate or alternative embodiments necessarily mutually exclusive of other embodiment(s). The same applies to the term “implementation,” “implementations,” etc.

The terms “a,” “an,” and “the” are intended to be interpreted to include one or more items. Further, the phrase “based on” is intended to be interpreted as “based, at least in part, on,” unless explicitly stated otherwise. The term “and/or” is intended to be interpreted to include any and all combinations of one or more of the associated items. The word “exemplary” is used herein to mean “serving as an example.” Any embodiment or implementation described as “exemplary” is not necessarily to be construed as preferred or advantageous over other embodiments or implementations.

Use of ordinal terms such as “first,” “second,” “third,” etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such.

What is claimed is:

1. An auxiliary drive system for driving a vacuum pump in a pump priming system, the auxiliary drive system comprising:

a drive sprocket attached to a drive shaft of a main pump, the drive shaft including a first end and a second end;

an auxiliary sprocket attached to a shaft of the vacuum pump;

an idler pulley mounted to an engine bracket of the main pump; and an endless drive belt having an inner side and an outer side, wherein the outer side of the drive belt includes a first toothed surface that engages the drive sprocket, wherein the inner side of the drive belt includes a second toothed surface that engages the auxiliary sprocket and the idler pulley, and rotate the auxiliary sprocket without the endless drive belt encircling the drive sprocket.

2. The auxiliary drive system of claim 1, further comprising:

a tensioner pulley mounted to the engine bracket of the main pump, wherein the tensioner pulley is fixedly adjustable to stretch the endless drive belt.

3. The auxiliary drive system of claim 2, wherein the engine bracket further comprises a slot for adjusting a position of the tensioner pulley.

4. The auxiliary drive system of claim 1, wherein the engine bracket is configured to connect the main pump to a primary driver, wherein the engine bracket encircles the drive sprocket and the idler pulley, and wherein the engine bracket includes an opening that allows the belt to reach the auxiliary sprocket.

5. The auxiliary drive system of claim 1, further comprising:

a support plate including:

mounting holes configured to align with bolt holes in the engine bracket, whereby the support plate and the engine bracket are secured to a bearing frame with the same bolts; and a slot configured to receive a tensioner pulley assembly in multiple locations along the slot.

6. The auxiliary drive system of claim 1, wherein teeth of the drive sprocket have a length and pitch configured to engage teeth of the endless drive belt.

7. The auxiliary drive system of claim 1, wherein the idler pulley is adjustably positioned along a slot in the engine bracket.

8. The auxiliary drive system of claim 1, wherein the drive sprocket has a contact angle of at least ninety degrees with the endless drive belt.

9. The auxiliary drive system of claim 1, wherein the engine bracket includes a flange with standardized connections for the primary driver.

10. An engine bracket for a centrifugal pump, the engine bracket comprising:

a faceplate including bolt holes that align with a bearing frame of the centrifugal pump;

a flange including connections for a primary driver of the centrifugal pump;

a central opening for a drive shaft;

an internal cavity configured to substantially encircle the drive shaft and a drive sprocket;

a second opening that provides access to the internal cavity; and a mounting hole configured to receive an idler pulley assembly, wherein the mounting hole is located lower, in relation to the second opening, than the central opening.

11. The engine bracket of claim 10, further comprising:

a slot configured to receive a tensioner pulley assembly in multiple locations along the slot.

12. The engine bracket of claim 11, wherein the slot is located between the central opening and the second opening.

13. The engine bracket of claim 10, further comprising:

a support plate including:

mounting holes configured to align with the bolt holes, whereby the support plate and the engine bracket are secured to the bearing frame with the same bolts; and a slot configured to receive a tensioner pulley assembly in multiple locations along the slot.

14. The engine bracket of claim 10, wherein the mounting hole comprises a slot configured to receive the idler pulley assembly in multiple locations along the slot.

15. A self-priming pump system, comprising:

a main centrifugal pump including a pump casing and drive shaft, the drive shaft including a first end and a second end, wherein the first end is enclosed within the pump casing, and wherein the second end is connected to a primary driver that drives the drive shaft;

an engine bracket mounted between the main centrifugal pump and the primary driver, wherein the engine bracket includes a cavity in which the drive shaft connects to the primary driver;

a drive sprocket attached to the drive shaft within the cavity;

an auxiliary shaft configured to drive a vacuum pump assembly mounted on the pump casing;

an auxiliary sprocket attached to the auxiliary shaft;

an idler pulley mounted in the cavity of the engine bracket; and an endless drive belt having an inner side and an outer side, wherein the outer side of the drive belt includes a first toothed surface that engages the drive sprocket, wherein the inner side of the drive belt includes a second toothed surface that engages the auxiliary sprocket and the idler pulley, and wherein the endless drive belt is configured to be installed without encircling the drive sprocket.

16. The self-priming pump system of claim 15, further comprising:

a tensioner pulley assembly mounted to the engine bracket.

* * * * *